(12) United States Patent
Pulisciano et al.

(10) Patent No.: US 10,788,315 B2
(45) Date of Patent: Sep. 29, 2020

(54) COMPUTER IMPLEMENTED METHODS FOR DETERMINING A DIMENSION OF A GAP BETWEEN AN AEROFOIL AND A SURFACE OF AN ENGINE CASING

(71) Applicant: ROLLS-ROYCE plc, London (GB)

(72) Inventors: Adriano Pulisciano, Birmingham (GB); Mohammad Dabbah, Southampton (GB); Harold M. Uzzell, Southampton (GB); Edward Sparks, Curdridge (GB)

(73) Assignee: ROLLS-ROYCE plc, London (GB)

(*) Notice: Subject to any disclaimer, the term of this patent is extended or adjusted under 35 U.S.C. 154(b) by 481 days.

(21) Appl. No.: 15/696,823

(22) Filed: Sep. 6, 2017

(65) Prior Publication Data

US 2018/0094537 A1 Apr. 5, 2018

(30) Foreign Application Priority Data

Oct. 4, 2016 (GB) .................................. 1616816.3

(51) Int. Cl.
*G01B 11/14* (2006.01)
*G06T 7/00* (2017.01)
(Continued)

(52) U.S. Cl.
CPC ............ *G01B 11/14* (2013.01); *F01D 21/003* (2013.01); *G06T 7/0004* (2013.01); *G06T 7/593* (2017.01); *H04N 13/20* (2018.05); *F05D 2220/32* (2013.01); *F05D 2260/83* (2013.01); *G01B 21/16* (2013.01); *G06T 7/13* (2017.01);
(Continued)

(58) Field of Classification Search
CPC ...... H04N 13/20; F01D 21/003; G06T 7/0004; G06T 7/593; G01B 11/14
See application file for complete search history.

(56) References Cited

U.S. PATENT DOCUMENTS 4,165,178 A * 8/1979 Coumo, Jr. ............ G01B 11/14
356/3
8,866,920 B2 * 10/2014 Venkataraman ... G02B 13/0015
348/218.1
(Continued)

FOREIGN PATENT DOCUMENTS

EP 1 550 791 A2 7/2005
EP 3 130 887 A1 2/2017

OTHER PUBLICATIONS

Feb. 26, 2018 Search Report issued in European Patent Application No. 17 18 9217.
(Continued)

*Primary Examiner* — Stephanie E Bloss
(74) *Attorney, Agent, or Firm* — Oliff PLC (57) ABSTRACT

A computer implemented method of determining a dimension of a gap between an edge of an aerofoil and a surface of an engine casing, the method comprising: receiving data; generating a three dimensional model of the surface of the engine casing from the received data; identifying the edge of the aerofoil in the received data; determining a three dimensional position of a first location along the edge of the aerofoil in the received data using the identified edge; and determining a distance between the determined three dimensional position of the first location and the three dimensional model of the surface of the engine casing using an algorithm.

17 Claims, 6 Drawing Sheets (51) Int. Cl.
*G01B 21/16* (2006.01)
*G06T 7/13* (2017.01)
*G06T 17/00* (2006.01)
*H04N 13/20* (2018.01)
*G06T 7/593* (2017.01)
*F01D 21/00* (2006.01)

(52) U.S. Cl.
CPC .......... *G06T 17/00* (2013.01); *G06T 2200/04* (2013.01); *G06T 2207/10012* (2013.01); *G06T 2207/10028* (2013.01); *G06T 2207/30164* (2013.01)

(56) References Cited

U.S. PATENT DOCUMENTS

| | | | | |
|---|---|---|---|---|
| 9,412,189 B2* | 8/2016 | Bendall | ................ | H04N 5/372 |
| 9,646,201 B1* | 5/2017 | Horowitz | ................ | G06T 7/251 |
| 2003/0031368 A1* | 2/2003 | Myler | ................ | H04N 17/02 |
| | | | | 382/228 |
| 2013/0182902 A1* | 7/2013 | Holz | ................ | G06T 7/75 |
| | | | | 382/103 |
| 2015/0235104 A1* | 8/2015 | Van Lierde | ................ | G06K 9/52 |
| | | | | 382/128 |
| 2016/0171705 A1* | 6/2016 | Bendall | ................ | G01B 11/03 |
| | | | | 382/103 |
| 2018/0024532 A1* | 1/2018 | Burton | ................ | G01B 11/245 |
| | | | | 700/114 |

OTHER PUBLICATIONS

M.A. Hafner et al.; "Blade Tip Measurement Advanced Visualization using a Three Dimensional Representation", Proceedings of ASME Turbo Expo; pp. 419-425; Jun. 6-10, 2011; vol. 3, No. GT2011-46523.
Hubben et al.; "Advances in Three Dimensional Measurement in Remote Visual Inspection;" 18th World Conference on Nondestructive Testing; Apr. 16-20, 2012, Durban, South Africa.
Mar. 20, 2017 Search Report issued in British Patent Application No. GB1616816.3.

* cited by examiner

COMPUTER IMPLEMENTED METHODS FOR DETERMINING A DIMENSION OF A GAP BETWEEN AN AEROFOIL AND A SURFACE OF AN ENGINE CASING

TECHNOLOGICAL FIELD

The present disclosure concerns computer implemented methods, apparatus, computer programs, non-transitory computer readable storage mediums for determining a dimension of a gap between an aerofoil and a surface of an engine casing.

BACKGROUND

Power generation systems may include a plurality of components whose positioning affects the performance and/or efficiency of the system. In a gas turbine engine for example, various components define the main gas path through the gas turbine engine and the relative positioning of the components may affect the performance and/or efficiency of the gas turbine engine. For example, a compressor blade and an engine case define a tip clearance there between. The efficiency of the gas turbine engine may increase as the tip clearance decreases since less gas spills over the top of the compressor blade in operation. However, as the tip clearance decreases, the compressor blade may contact the engine case while rotating, causing wear on the compressor blade and the casing. This may reduce the service life of the compressor blade and the engine casing and thereby increase the operational costs of the gas turbine engine.

BRIEF SUMMARY

According to various examples there is provided a computer implemented method of determining a dimension of a gap between an edge of an aerofoil and a surface of an engine casing, the method comprising: receiving data; generating a three dimensional model of the surface of the engine casing using the received data; identifying the edge of the aerofoil in the received data; determining a three dimensional position of a first location along the edge of the aerofoil in the received data using the identified edge; and determining a distance between the determined three dimensional position of the first location and the three dimensional model of the surface of the engine casing using an algorithm.

The distance may be measured along a normal between the determined three dimensional position of the first location and the three dimensional model of the surface of the engine casing.

The algorithm may include: measuring a plurality of distances between the three dimensional position of the first location and a plurality of locations on the three dimensional model of the surface of the engine casing; and selecting a shortest distance from the plurality of measured distances.

The algorithm may include: using an equation defining the edge of the aerofoil and an equation defining the three dimensional model of the surface of the engine casing.

Identifying the edge of the aerofoil may include convolution with Gabor wavelets and active contour tracking.

Identifying the edge of the aerofoil may include: identifying one or more pairs of edges within the received data; and selecting a pair of edges from the one or more pairs of identified edges that satisfies at least one predetermined criterion.

The predetermined criterion may be one of: minimum length; minimum overlap; maximum angular separation; maximum pixel gap; and maximum gap size variance.

The received data may be generated by stereophotogrammetry apparatus and may include a first image and a second image.

Generating a three dimensional model of the surface of the engine casing may include: identifying a plurality of features of the engine casing in the first image and in the second image to generate a plurality of points; and using the plurality of generated points to generate the three dimensional model of the surface of the engine casing.

Generation of the three dimensional model of the surface of the engine casing may include modelling the surface as a linear plane or as a curved surface.

The received data may be generated by the stereophotogrammetry apparatus during relative movement between the aerofoil and the engine casing.

The received data may be generated by a structured light three dimensional scanner.

The computer implemented method may be performed automatically and without user intervention.

According to various examples there is provided a computer program that, when read by a computer, causes performance of the computer implemented method as described in any of the preceding paragraphs.

According to various examples there is provided a non-transitory computer readable storage medium comprising computer readable instructions that, when read by a computer, cause performance of the computer implemented method as described in any of the preceding paragraphs.

According to various examples there is provided apparatus for determining a dimension of a gap between an edge of an aerofoil and a surface of an engine casing, the apparatus comprising a controller configured to: receive data; generate a three dimensional model of the surface of the engine casing using the received data; identify the edge of the aerofoil in the received data; determine a three dimensional position of a first location along the edge of the aerofoil in the received data using the identified edge; and determine a distance between the determined three dimensional position of the first location and the three dimensional model of the surface of the engine casing using an algorithm.

The controller may be configured to measure the distance along a normal between the determined three dimensional position of the first location and the three dimensional model of the surface of the engine casing.

The algorithm may include: measuring a plurality of distances between the three dimensional position of the first location and a plurality of locations on the three dimensional model of the surface of the engine casing; and selecting a shortest distance from the plurality of measured distances.

The algorithm may include: using an equation defining the edge of the aerofoil and an equation defining the three dimensional model of the surface of the engine casing.

The controller may be configured to identify the edge of the aerofoil by performing convolution with Gabor wavelets and active contour tracking.

The controller may be configured to identify the edge of the aerofoil by: identifying one or more pairs of edges within the received data; and selecting a pair of edges from the one or more pairs of identified edges that satisfies at least one predetermined criterion.

The predetermined criterion may be one of: minimum length; minimum overlap; maximum angular separation; maximum pixel gap; and maximum gap size variance.

The received data may be generated by stereophotogrammetry apparatus and may include a first image and a second image.

The controller may be configured to generate a three dimensional model of the surface of the engine casing by: identifying a plurality of features of the engine casing in the first image and in the second image to generate a plurality of points; and using the plurality of generated points to generate the three dimensional model of the surface of the engine casing.

Generation of the three dimensional model of the surface of the engine casing may include modelling the surface as a linear plane or as a curved surface.

The received data may be generated by the stereophotogrammetry apparatus during relative movement between the aerofoil and the engine casing.

The received data may be generated by a structured light three dimensional scanner.

The controller may be configured to operate automatically and without user intervention.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
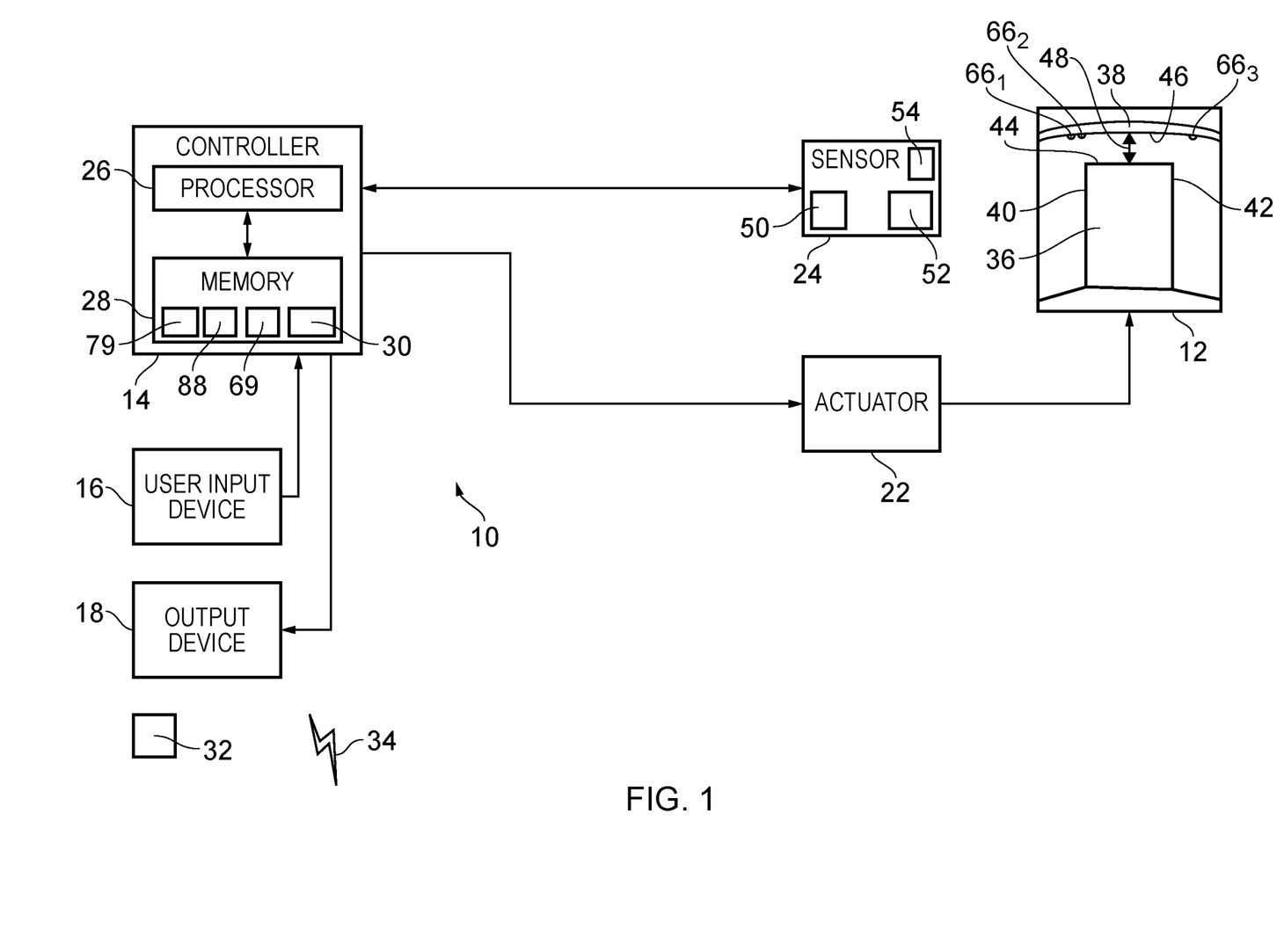
FIG. 1 illustrates a schematic diagram of apparatus for determining a dimension of a gap between an edge of an aerofoil and a surface of an engine casing according to various examples.

FIG. 1 illustrates a schematic diagram of an apparatus 10 and a gas turbine engine 12 according to various examples. The apparatus 10 includes a controller 14, a user input device 16, an output device 18, an actuator 22, and a sensor 24. In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 14, and the remaining features (such as the user input device 16, the output device 18, the actuator 22, and the sensor 24) may be added by another manufacturer, or by an end user.

The gas turbine engine 12 may be used in any industry and may be, for example, an aerospace gas turbine engine mounted on an aeroplane, a marine gas turbine engine mounted within a vessel, or an industrial gas turbine engine for generating electricity. The gas turbine engine 12 includes an aerofoil 36 and an engine case 38 that houses the aerofoil 36. For example, the aerofoil 36 may be a compressor blade and the engine case 38 may be a compressor case. By way of another example, the aerofoil 36 may be a turbine blade and the engine case 38 may be a turbine case.

The aerofoil 36 includes a leading edge 40, a trailing edge 42, and an edge 44 that extends between the leading edge 40 and the trailing edge 42. The engine case 38 defines an annulus and includes an inner surface 46 and first, second and third surface features $66_1$, $66_2$, $66_3$. The edge 44 of the aerofoil 36 and the surface 46 of the engine case 38 define a gap 48 there between. The size of the gap 48 may be referred to as the 'tip clearance' of the aerofoil 36 within the gas turbine engine 12.

It should be appreciated that the aerofoil 36 may include abradable material that defines the edge 44 of the aerofoil 36. Similarly, the engine case 38 may include an abradable liner that defines the inner surface 46 of the engine case 38. In these examples, the gap 48 is defined between the abradable material of the aerofoil 36 and the abradable liner of the engine case 38.

The controller 14, the user input device 16, the output device 18, the actuator 22 and the sensor 24 may be coupled to one another via a wireless link and may consequently comprise transceiver circuitry and one or more antennas. Additionally or alternatively, the controller 14, the user input device 16, the output device 18, the actuator 22 and the sensor 24 may be coupled to one another via a wired link and may consequently comprise interface circuitry (such as a Universal Serial Bus (USB) socket). It should be appreciated that controller 14, the user input device 16, the output device 18, the actuator 22 and the sensor 24 may be coupled to one another via any combination of wired and wireless links.

The controller 14 may be located on the gas turbine engine 12. For example, the controller 14 may be the full authority digital engine control (FADEC), or may be another controller mounted on the gas turbine engine 12. Alternatively, the controller 14 may be located remote from the gas turbine engine 12. For example, the controller 14 may be the controller of the aircraft to which the gas turbine engine 12 is mounted. By way of another example, the controller 14 may be located remote from the aircraft and the gas turbine engine 12 and may be located at another site. For example, the controller 14 may be based in a different city, county, state or country to the gas turbine engine 12. Alternatively, the controller 14 may be distributed between the gas turbine engine 12 (and/or the aircraft) and a location remote from the gas turbine engine 12 and the aircraft.

Figure 2:
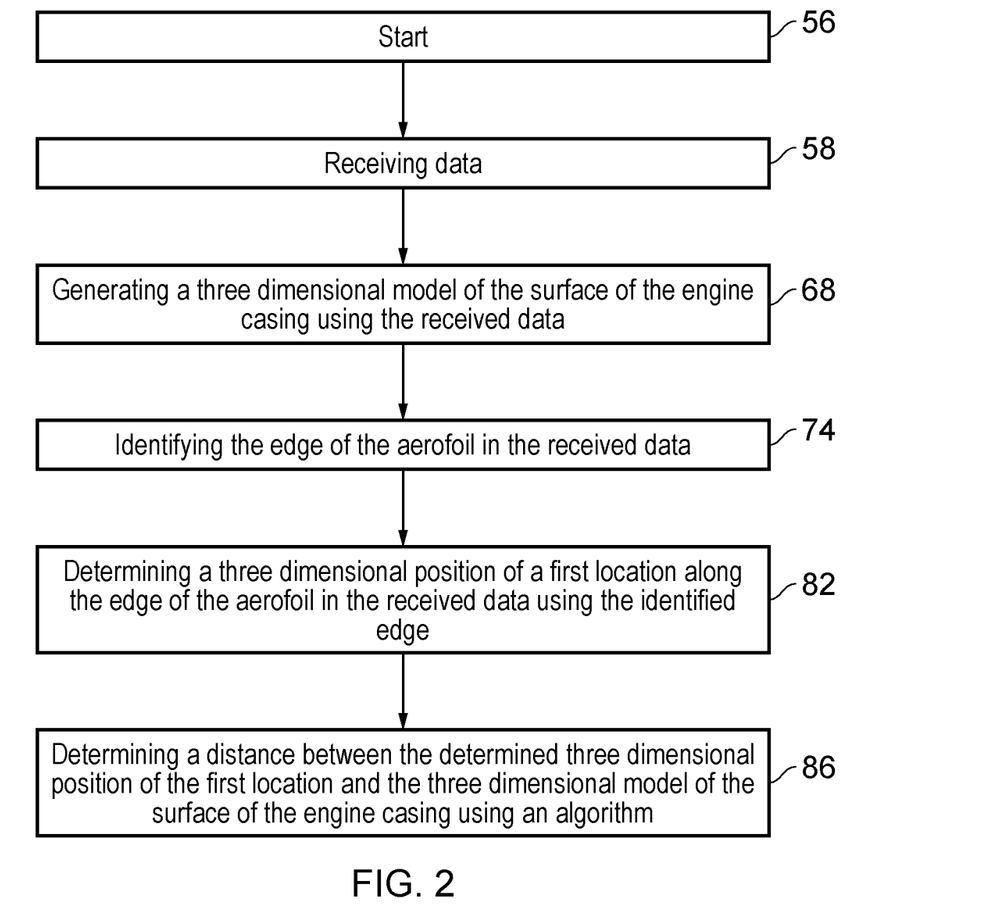
FIG. 2 illustrates a flow diagram of a method of determining a dimension of a gap between an edge of an aerofoil and a surface of an engine casing according to various examples.
Figure 4:
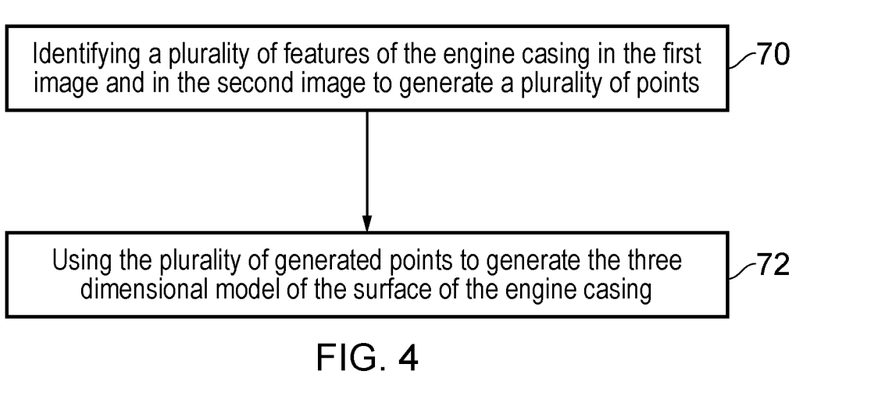
FIG. 4 illustrates a flow diagram of a method of generating a three dimensional model of a surface of the engine casing according to various examples.
Figure 5:
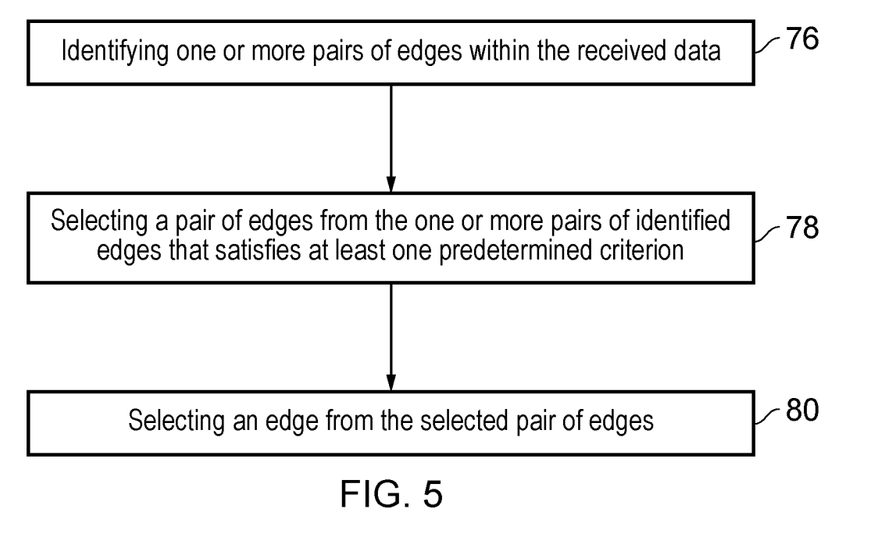
FIG. 5 illustrates a flow diagram of a method of identifying an edge of an aerofoil according to various examples.

The controller 14 may comprise any suitable circuitry to cause performance of the methods described herein and as illustrated in FIGS. 2, 4 and 5. The controller 14 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 14 may comprise at least one processor 26 and at least one memory 28. The memory 28 stores a computer program 30 comprising computer readable instructions that, when read by the processor 26, causes performance of the methods described herein, and as illustrated in FIGS. 2, 4 and 5. The computer program 30 may be software or firmware, or may be a combination of software and firmware.

The processor 26 may include at least one microprocessor and may comprise a single core processor, may comprise multiple processor cores (such as a dual core processor or a quad core processor), or may comprise a plurality of processors (at least one of which may comprise multiple processor cores).

The memory 28 may be any suitable non-transitory computer readable storage medium, data storage device or devices, and may comprise a hard disk and/or solid state memory (such as flash memory). The memory 28 may be permanent non-removable memory, or may be removable memory (such as a universal serial bus (USB) flash drive or a secure digital card). The memory 28 may include: local memory employed during actual execution of the computer program 30; bulk storage; and cache memories which provide temporary storage of at least some computer readable or computer usable program code to reduce the number of times code may be retrieved from bulk storage during execution of the code.

The computer program 30 may be stored on a non-transitory computer readable storage medium 32. The computer program 30 may be transferred from the non-transitory computer readable storage medium 32 to the memory 28. The non-transitory computer readable storage medium 32 may be, for example, a USB flash drive, a secure digital (SD) card, an optical disc (such as a compact disc (CD), a digital versatile disc (DVD) or a Blu-ray disc). In some examples, the computer program 30 may be transferred to the memory 28 via a signal 34 (which may be a wireless signal or a wired signal).

Input/output devices may be coupled to the apparatus 10 either directly or through intervening input/output controllers. Various communication adaptors may also be coupled to the controller 14 to enable the apparatus 10 to become coupled to other apparatus or remote printers or storage devices through intervening private or public networks. Non-limiting examples include modems and network adaptors of such communication adaptors.

The user input device 16 may comprise any suitable device for enabling an operator to at least partially control the apparatus 10. For example, the user input device 16 may comprise one or more of a keyboard, a keypad, a touchpad, a touchscreen display, and a computer mouse. The controller 14 is configured to receive signals from the user input device 16.

The output device 18 may be any suitable device for conveying information to a user. For example, the output device 18 may include a display (such as a liquid crystal display, or a light emitting diode display, or an active matrix organic light emitting diode display, or a thin film transistor display), and/or a loudspeaker, and/or a printer (such as an inkjet printer or a laser printer). The controller 14 is arranged to provide a signal to the output device 18 to cause the output device 18 to convey information to the user.

The actuator 22 is configured to control rotation of the aerofoil 36 relative to the engine case 38. In some examples, the actuator 22 may be an auxiliary power unit (APU) that is configured to rotate the aerofoil 36 by supplying electrical energy to an accessory gearbox of the gas turbine engine 12. In other examples, the actuator 22 may be an elongate device that is insertable into the gas turbine engine 12 and includes a motor driven belt that engages and rotates the aerofoil 36 relative to the engine case 38. The controller 14 may be configured to control the actuator 22 (for example, by transmitting a control signal to an auxiliary power unit). In other examples, the actuator 22 may be an operator who manually rotates the aerofoil 36 relative to the engine case 38.

The sensor 24 may comprise any suitable circuitry that enables the gap 48 to be measured by the controller 14. In some examples, the sensor 24 may comprise stereophotogrammetry apparatus 50 that is configured to simultaneously obtain two images and then provide the two images to the controller 14. The stereophotogrammetry apparatus 50 may comprise two sensors (for example, two complementary metal oxide semiconductor (CMOS) image sensors, or two charge coupled device (CCD) image sensors) or may comprise a single sensor and two optical elements (two prisms for example). In other examples, the sensor 24 may (additionally or alternatively) comprise a structured light three dimensional scanner 52 that is configured to generate point cloud data of the aerofoil 36 and the engine case 38. The controller 14 is configured to receive data from the sensor 24.

In some examples, the sensor 24 may comprise robotics 54 to enable the position of the sensor 24 to be changed relative to the gas turbine engine 12. For example, the sensor 24 may comprise a continuum robot (which may also be referred to as a snake arm robot) that may be manoeuvred into position within the gas turbine engine 12. The controller 14 may be configured to control the robotics 54 of the sensor 24 to position the sensor 24 within the gas turbine engine 12. In some examples, an operator may operate the user input device 16 to control the movement of the robotics 54 of the sensor 24.

The operation of the apparatus 10 according to various examples is described in the following paragraphs and with reference to the figures.

Turning to FIG. 2, at block 56, the method starts and may include calibrating the sensor 24. For example, where the sensor 24 includes the stereophotogrammetry apparatus 50, block 56 may include determining intrinsic parameters (a calibration matrix and distortion coefficients) and extrinsic camera parameters (a rotation matrix and a translation vector that define the relationship between the positions of the two sensors or two optical elements). The controller 14 may use the intrinsic parameters for the triangulation of points and the correction of pixel position due to distortion (known as rectification). The controller 14 may use the extrinsic parameters for the triangulation of points in three dimensions.

Block 56 may include controlling the robotics 54 of the sensor 24 to move the sensor 24 to a location within the gas turbine engine 12. For example, where the robotics 54 includes a continuum robot, the controller 14 may control the continuum robot 54 to manoeuvre within the gas turbine engine 10 to reach a desired location.

Block 56 may include controlling the aerofoil 36 to rotate relative to the engine case 38. For example, the controller 14 may control the actuator 22 to rotate the aerofoil 36 relative to the engine case 38.

Block 56 may include controlling the sensor 24 to generate data. For example, where the sensor 24 includes stereophotogrammetry apparatus 50, the controller 14 may control the stereophotogrammetry apparatus 50 to simultaneously generate a first image and a second image of the aerofoil 36 and the engine case 38. The data may be generated by the stereophotogrammetry apparatus 50 during relative movement between the aerofoil 36 and the engine casing 38 and a plurality of first images and a plurality of second images may be generated by the stereophotogrammetry apparatus 50.

Figure 3A:
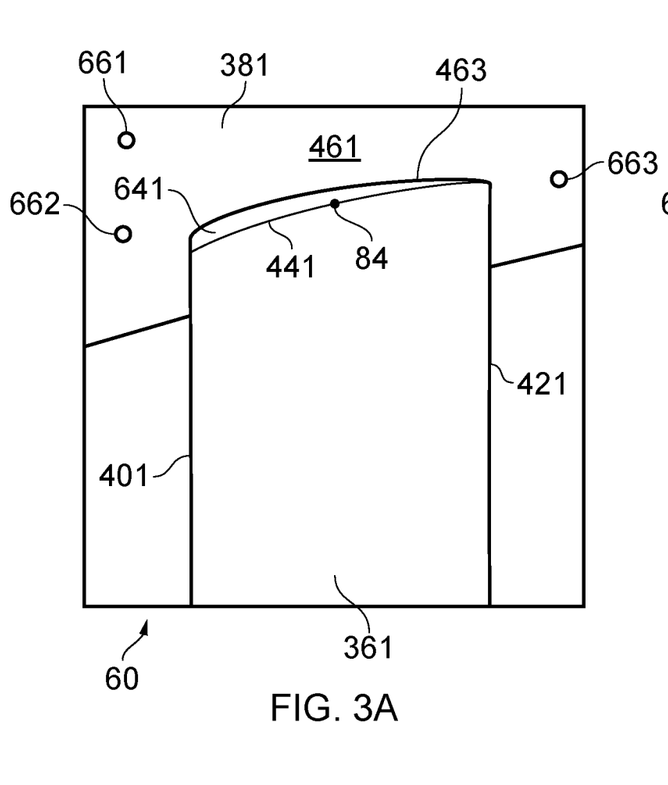
FIGS. 3A and 3B illustrate first and second images respectively of an aerofoil and an engine casing.
Figure 3B:
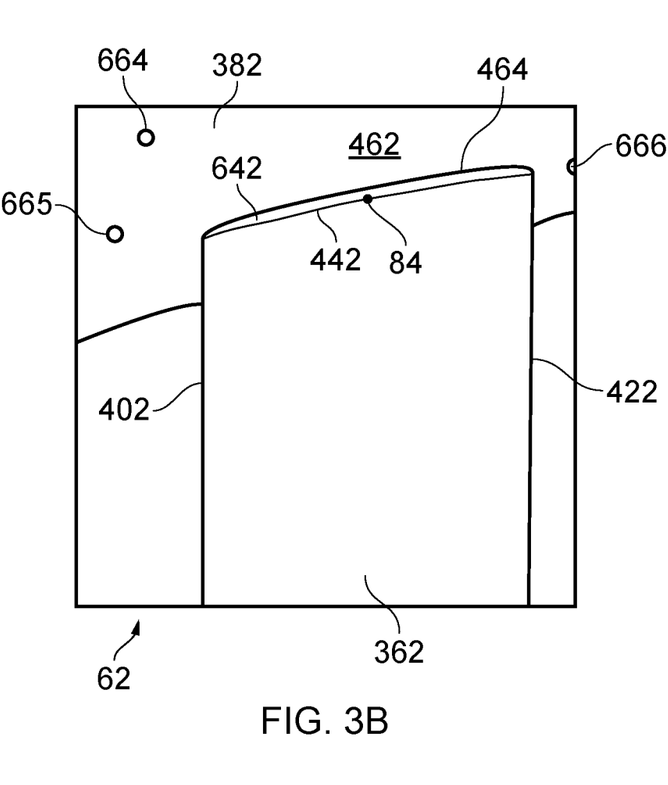

At block 58, the method includes receiving data from the sensor 24. For example, the controller 14 may receive a first image 60 as illustrated in FIG. 3A and a second image 62 as illustrated in FIG. 3B from the stereophotogrammetry apparatus 50.

The first image 60 includes a first aerofoil image 361 of the aerofoil 36, a first engine case image 381 of the engine case 38, and a first shadow image 641. The first shadow image 641 is caused by the aerofoil 36 and the engine case 38 being illuminated and the aerofoil 36 casting a shadow on the engine case 38. The first aerofoil image 361 includes a first leading edge image 401, a first trailing edge image 421, and a first edge image 441. The first engine case image 381 includes a first inner surface image 461, a first surface feature image 661, a second surface feature image 662, and a third surface feature image 663. The first, second and third surface feature images 661, 662, 663 are generated from the first, second and third surface features $66_1$, $66_2$, $66_3$ on the surface 46 of the engine case 38 respectively.

The second image 62 includes a second aerofoil image 362 of the aerofoil 36, a second engine case image 382 of the engine case 38, and a second shadow image 642. The second aerofoil image 362 includes a second leading edge image 402, a second trailing edge image 422, and a second edge image 442. The second engine case image 382 includes a second inner surface image 462, a fourth surface feature image 664, a fifth surface feature image 665 and a sixth surface feature image 666. The fourth, fifth and sixth surface feature images 664, 665 and 666 are also generated from the first, second and third surface features $66_1$, $66_2$, $66_3$ on the surface 46 of the engine case 38 respectively.

In other examples, the controller 14 may receive three dimensional point cloud data of the aerofoil 36 and the engine case 38 from the structured light three dimensional scanner 52.

At block 68, the method includes generating a three dimensional model 69 of the surface 46 of the engine casing 38 using the received data. Where the received data is generated by the stereophotogrammetry apparatus 50, the three dimensional model 69 of the surface 46 may be generated in accordance with the method illustrated in FIG. 4.

At block 70, the method may include identifying a plurality of features $66_1$, $66_2$, $66_3$ of the engine case 38 in the first image 60 and in the second image 62 to generate a plurality of points. For example, the controller 14 may analyse the first image 60 to identify the first, second and third surface feature images 661, 662, 663, and may analyse the second image 62 to identify the fourth, fifth and sixth surface feature images 664, 665, 666. The controller 14 may use an Oriented Fast and Rotated Brief (ORB) detector and an epipolar constraint, or may use a scale-invariant feature transform (SIFT) algorithm, or may use a speeded up robust features (SURF) detector to identify the plurality of features 661, 662, 663, 664, 665, 666 in the first image 60 and in the second image 62.

Where the received data includes a stream of images over a period of time (that is, a video), the controller 14 may identify the engine case 38 within the received images by determining which surface includes surface feature images that do not change position over a period of time.

At block 72, the method may include using the plurality of generated points to generate the three dimensional model 69 of the surface 46 of the engine case 38. For example, the controller 14 may use the generated points for the first surface feature image 661 and the fourth surface feature image 664, and the calibration parameters, to determine three dimensional coordinates for the first surface feature $66_1$ on the surface 46. The controller 14 may use the generated points for the second surface feature image 662 and the fifth surface feature image 665, and the calibration parameters, to determine three dimensional coordinates for the second surface feature $66_2$ on the surface 46. The controller 14 may use the generated points for the third surface feature image 663 and the sixth surface feature image 666, and the calibration parameters, to determine three dimensional coordinates for the third surface feature $66_3$ on the surface 46.

The controller 14 may then model the surface 46 as a linear plane or as a curved surface to generate the three dimensional model 69. For example, the controller 14 may generate a linear plane which intersects the determined three dimensional coordinates for the generated points of the first surface feature $66_1$, the second surface feature $66_2$ and the third surface $66_3$ to generate the three dimensional model 69. In examples where sufficient points are generated from surface features on the engine case 38, the controller 14 may recreate the surface 46 in three dimensions to generate the three dimensional model 69.

The controller 14 may store the generated three dimensional model 69 of the surface 46 of the engine case 38 in the memory 28.

Returning to FIG. 2, at block 74, the method includes identifying the edge 44 of the aerofoil 36 in the received data. Where the received data is generated by the stereophotogrammetry apparatus 50, the edge 44 of the aerofoil 36 may be identified in accordance with the method illustrated in FIG. 5.

At block 76, the method includes identifying one or more pairs of edges within the received data. For example, the controller 14 may analyse the first image 60 using an edge detection algorithm (for example, a canny edge detection algorithm) to identify the first edge image 441 and a third edge image 463 (the first edge image 441 and the third edge image 463 defining the first shadow image 641). The controller 14 may also analyse the second image 62 using an edge detection algorithm (for example, a canny edge detection algorithm) to identify the second edge image 442 and a fourth edge image 464 (the second edge image 442 and the fourth edge image 464 defining the second shadow image 642).

Block 76 may also include performing noise reduction on the first and second images 60, 62 prior to the identification of the one or more pairs of edges. For example, the controller 14 may use a median filter, a Gaussian filter, or a bilateral filter, to reduce noise in the first and second images 60, 62 prior to the identification of the one or more pairs of edges.

At block 78, the method includes selecting a pair of edges from the one or more pairs of identified edges that satisfies at least one predetermined criterion. The one or more predetermined criterion includes (but are not limited to): minimum length; minimum overlap; maximum angular separation; maximum pixel gap; and maximum gap size variance. It should be appreciated that block 78 is performed for both the first and second images 60, 62.

For example, the controller 14 may determine whether the first and third edge images 441, 463 are longer than a minimum number of pixels. By way of another example, the controller 14 may determine whether the first and third edge images 441, 463 have overlapping portions that exceed a minimum overlap length (indicating that the first and third edge images 441, 463 are opposite one another). By way of a further example, the controller 14 may determine whether the first and third edge images 441, 463 define an angle there between that exceeds a maximum angular separation (since the first and third edge images 441, 463 should be close to parallel). By way of another example, the controller 14 may determine whether the number of pixels separating the first and third edge images 441, 463 exceeds a maximum pixel gap (that is, a maximum number of pixels). By way of a further example, the controller 14 may determine whether the size of the gap between the first and third edge images 441, 463 varies in size above a maximum gap size variance.

The controller 14 may control storage of the selected pair of edges 79 in the memory 28.

In some examples, the controller 14 may fit parametric curves to the selected pair of edges 79. The parametric curves may be quadratic with the general equation $y = ax^2 + bx + c$.

At block 80, the method includes selecting the edge of the aerofoil from the selected pair of edges 79. For example, the controller 14 may select the first edge image 441 from the pair of edge images 441, 463 using the identification of the surface image 461 of the engine case described in the preceding paragraphs (that is, where the surface of the engine case is identified as including non-moving surface features). By way of another example, the controller 14 may select the first edge image 441 from the pair of edge images 441, 463 by selecting the edge image that has the lowest vertical position in the first image 60. The controller 14 also selects the second edge image 442 from the pair of edge images 442, 464 in the second image 62.

Figure 6:
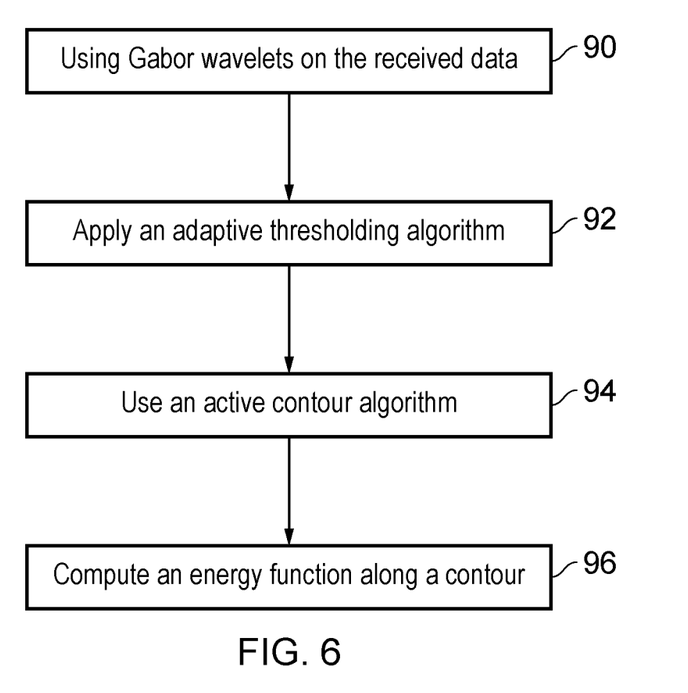
FIG. 6 illustrates a flow diagram of another method of identifying an edge of an aerofoil according to various examples.

Alternatively, the edge 44 of the aerofoil 36 may be identified in accordance with the method illustrated in FIG. 6. In this method, the edge of the aerofoil is identified by performing convolution with Gabor wavelets and active contour tracking.

At block 90, the method includes using Gabor wavelets on the received data. For example, the controller 14 may use Gabor wavelets of predefined orientations to enhance the tip clearance gap 641, 642. The Gabor wavelets are tuned at certain frequencies and variances of the Gaussian envelope of the kernel to exploit the curvilinear shape of the edges.

At block 92, the method includes applying an adaptive thresholding algorithm. For example, the controller 14 may apply an adaptive thresholding algorithm on the output from block 90 to convert the image into a binary format, where areas of interest may be labelled as '1' and other areas may be labelled as '0'.

At block 94, each of the isolated areas of interest are then assessed individually according to (but are not limited to) size, shape, orientation, location and so on. The selected areas of interest are then used as an initial position to search for an accurate gap edge using an active contour algorithm. For example, the controller 14 may use an active contour algorithm to search for an edge in a selected area of interest.

Once an edge is detected, the method moves to block 96 and an energy function along that contour is computed in order to identify erroneous detections. For example, the controller 14 may compute an energy function along a contour. The computed energy is based on the change of image intensity values along the detected edge. For a correct detection, the energy change is minimal or very small (for example, below a relatively low threshold value).

Returning to FIG. 2, at block 82, the method includes determining a three dimensional position of at least a first location along the edge of the aerofoil in the received data using the identified edge. For example, where the received data includes the first and second images 60, 62, the controller 14 may triangulate the three dimensional position of the location 84 along the identified first and second edge images 441, 442. It should be appreciated that at block 82, the method may include determining three dimensional positions of a plurality of locations along the edge of the aerofoil.

In examples where parametric curves are fitted to the selected pair of edges 79, epipolar lines may be used to match points along the parametric curves in the first and second images 60, 62. The matched points are then triangulated in three dimensions as described above for the surface 46 of the engine case 38 to provide the three dimensional position of at least the first location 84.

In order to reduce error, these matched points identified on the parametric curves of the detected edges in images 60 and 62, are then verified to belong to the same point on the actual aerofoil blade using a bespoke binary feature vector. Once the coordinates of the match points are identified in image 60 and 62, binary feature vectors for each are generated and compared to each other using the hamming distance. If the hamming distance is below an empirical threshold, the points are said to be correspond to the same physical point on the aerofoil blade.

For each point, this feature vector is obtained by extending the original image (such as 60 and 62) by folding the boundaries in order to avoid boundary conditions, then generating a sobel image for the extended image. The extended image and sobel image are the combined as different channels of the same image. And a feature vector of each channel is appended to the final feature vector that represents the point in the original image. For each channel the feature vector is generated using the Binary Robust Independent Elementary Features (BRIEF) descriptor.

It should be appreciated that blocks 68, 74 and 82 may be performed sequentially or may be performed in parallel. For example, the controller 14 may perform block 68 (including blocks 70 and 72) at the same time as performing blocks 74 (including blocks 76, 78, 80) and 82.

At block 86, the method includes determining a distance between the determined three dimensional position of the first location 84 and the three dimensional model 69 of the surface 44 of the engine case 38 using an algorithm 88. Where three dimensional positions of a plurality of locations along the edge of the aerofoil are determined at block 82, block 86 may include determining a plurality of distances between the plurality of locations and the three dimensional model 69 of the surface 44 of the engine case 38.

In some examples, the algorithm 88 includes measuring a plurality of distances between the three dimensional position of the first location 84 and a plurality of locations on the three dimensional model 69 of the surface 44 of the engine casing 38. Additionally, the algorithm 88 includes selecting a shortest distance from the plurality of measured distances.

For example, where the three dimensional model 69 of the surface 44 is a linear plane mesh, the controller 14 may calculate a plurality of distances from the first location 84 to every point in the mesh that makes up the linear plane. The controller 14 may then select the shortest distance from the plurality of calculated distances.

In another example, the algorithm 88 may include using an equation defining the edge 44 of the aerofoil 36 and an equation defining the three dimensional model 69 of the surface 46 of the engine casing 38. For example, the controller 14 may extract equations that define the three dimensional model 69 of the surface 44 and the line that connects the plurality of locations along the edge of aerofoil. The controller 14 may then use the extracted equations to determine a shortest distance between the edge 44 of the aerofoil 36 and the surface 46 of the engine case 38. The distance may be measured along a normal between the determined three dimensional position of the first location 84 and the three dimensional model 69 of the surface 44 of the engine casing 38.

Where a plurality of distances are determined at block 86, the method may include taking an average of the plurality of determined distances to provide a single average distance. The controller 14 may control storage of the determined average distance for the aerofoil 36 in the memory 28. Additionally, the controller 14 may control the output device 18 to output the determined average distance to an operator.

The apparatus 10 and the above described methods may provide several advantages. First, the apparatus 10 and the methods may reduce the time required for determining the tip clearance of one or more aerofoils within a gas turbine engine. Second, the methodology may be performed automatically by the controller 14 and without intervention by an operator. In particular, the operator is not required to set the measurement locations for determining tip clearance. Third, tip clearance measurements may be made for all locations along an edge 44 of an aerofoil. Fourth, since tip clearance measurements may be stored in the memory 28, an operator may review how tip clearance measurements change over a period of time for a particular aerofoil.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

Except where mutually exclusive, any of the features may be employed separately or in combination with any other features and the disclosure extends to and includes all combinations and sub-combinations of one or more features described herein.

What is claimed is:

1. A computer implemented method of determining a dimension of a gap between an edge of an aerofoil and a surface of an engine casing, the method comprising:
   receiving data generated by a stereophotogrammetry apparatus and that includes a first image and a second image;
   generating a three dimensional model of the surface of the engine casing using the received data;
   identifying the edge of the aerofoil in the received data by identifying one or more pairs of edges in the data, the one or more pairs of edges corresponding to one or more shadow images, respectively, the one or more shadow images being caused by illuminating the aerofoil and the engine casing to result in the aerofoil casting a shadow on the engine casing, and selecting a pair of edges from the one or more pairs of edges that satisfies at least one predetermined criterion;
   determining a three dimensional position of a first location along the edge of the aerofoil in the received data using the identified edge; and
   measuring a distance between the determined three dimensional position of the first location and the three dimensional model of the surface of the engine casing using an algorithm.

2. The computer implemented method as claimed in claim 1, wherein the distance is measured along a normal between the determined three dimensional position of the first location and the three dimensional model of the surface of the engine casing.

3. The computer implemented method as claimed in claim 1, wherein the algorithm includes: measuring a plurality of distances between the three dimensional position of the first location and a plurality of locations on the three dimensional model of the surface of the engine casing; and selecting a shortest distance from the plurality of measured distances.

4. The computer implemented method as claimed in claim 1, wherein the algorithm includes: using an equation defining the edge of the aerofoil and an equation defining the three dimensional model of the surface of the engine casing.

5. The computer implemented method as claimed in claim 1, wherein identifying the edge of the aerofoil includes convolution with Gabor wavelets and active contour tracking.

6. The computer implemented method as claimed in claim 1, wherein the predetermined criterion is one of: minimum length; minimum overlap; maximum angular separation; maximum pixel gap; and maximum gap size variance.

7. The computer implemented method as claimed in claim 1, wherein generating a three dimensional model of the surface of the engine casing includes: identifying a plurality of features of the engine casing in the first image and in the second image to generate a plurality of points; and using the plurality of generated points to generate the three dimensional model of the surface of the engine casing.

8. The computer implemented method as claimed in claim 7, wherein generation of the three dimensional model of the surface of the engine casing includes modelling the surface as a linear plane or as a curved surface.

9. The computer implemented method as claimed in claim 1, wherein the received data is generated by the stereophotogrammetry apparatus during relative movement between the aerofoil and the engine casing.

10. The computer implemented method as claimed in claim 1, wherein the computer implemented method is performed automatically and without user intervention.

11. A non-transitory computer readable storage medium comprising computer readable instructions that, when read by a computer, cause performance of the computer implemented method as claimed in claim 1.

12. The computer implemented method as claimed in claim 1, further comprising storing the distance to a memory.

13. An apparatus for determining a dimension of a gap between an edge of an aerofoil and a surface of an engine casing, the apparatus comprising a controller configured to:
   receive data generated by a stereophotogrammetry apparatus and that includes a first image and a second image;
   generate a three dimensional model of the surface of the engine casing using the received data;
   identify the edge of the aerofoil in the received data by identifying one or more pairs of edges in the data, the one or more pairs of edges corresponding to one or more shadow images, respectively, the one or more shadow images being caused by illuminating the aerofoil and the engine casing to result in the aerofoil casting a shadow on the engine casing, and selecting a pair of edges from the one or more pairs of edges that satisfies at least one predetermined criterion;

determine a three dimensional position of a first location along the edge of the aerofoil in the received data using the identified edge; and measure a distance between the determined three dimensional position of the first location and the three dimensional model of the surface of the engine casing using an algorithm.

14. The apparatus as claimed in claim 13, wherein the algorithm includes: measuring a plurality of distances between the three dimensional position of the first location and a plurality of locations on the three dimensional model of the surface of the engine casing; and selecting a shortest distance from the plurality of measured distances.

15. The apparatus as claimed in claim 13, wherein the controller is configured to identify the edge of the aerofoil by: identifying one or more pairs of edges within the received data; and selecting a pair of edges from the one or more pairs of identified edges that satisfies at least one predetermined criterion.

16. The apparatus as claimed in claim 13, wherein the controller is configured to operate automatically and without user intervention.

17. The apparatus as claimed in claim 13, further comprising a memory configured to store the distance.

* * * * *